April 27, 1965 H. L. PETERSON 3,180,096
FLUID PRESSURE ACTUATING SYSTEM FOR USE IN
POWER STEERING OF OUTBOARD
MOTORS AND THE LIKE
Filed Jan. 22, 1964 3 Sheets-Sheet 2
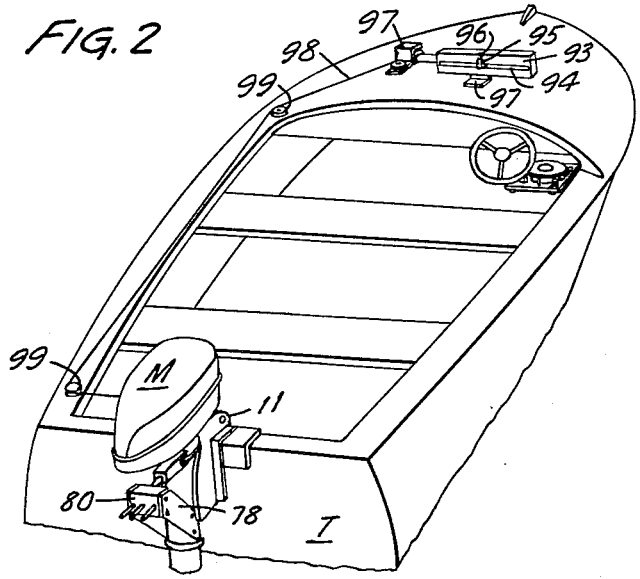
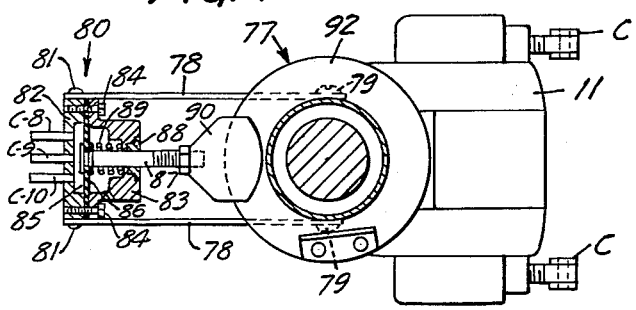
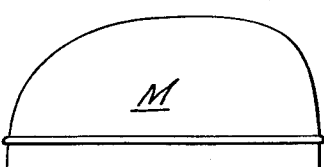
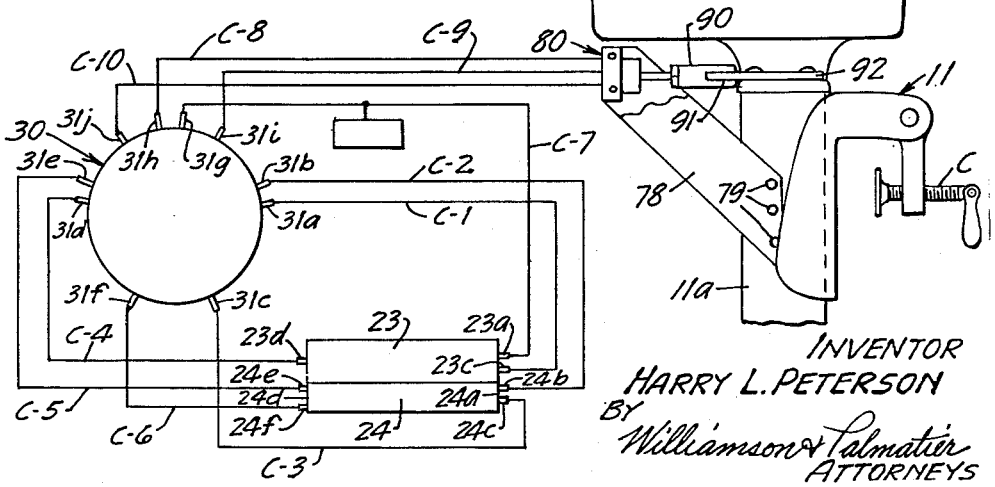
INVENTOR
HARRY L. PETERSON
BY
Williamson & Palmatier
ATTORNEYS April 27, 1965 H. L. PETERSON 3,180,096
FLUID PRESSURE ACTUATING SYSTEM FOR USE IN
POWER STEERING OF OUTBOARD
MOTORS AND THE LIKE
Filed Jan. 22, 1964 3 Sheets-Sheet 3
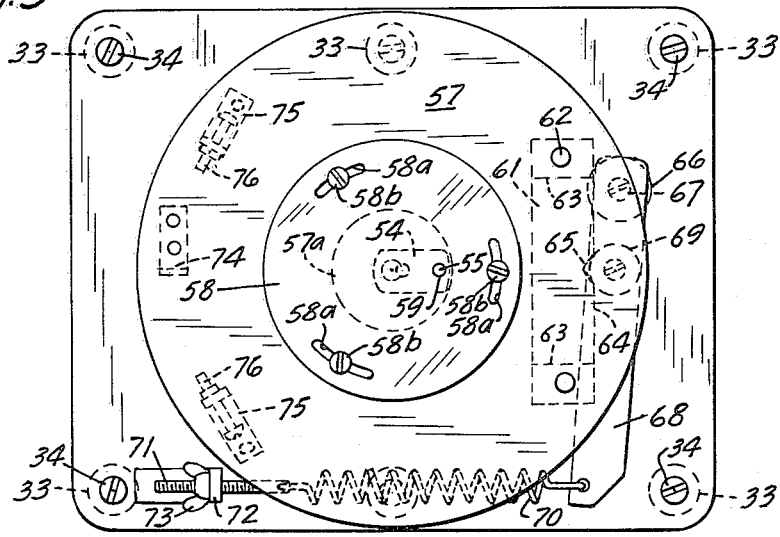
INVENTOR
HARRY L. PETERSON
BY
Williamson+Palmatier
ATTORNEYS

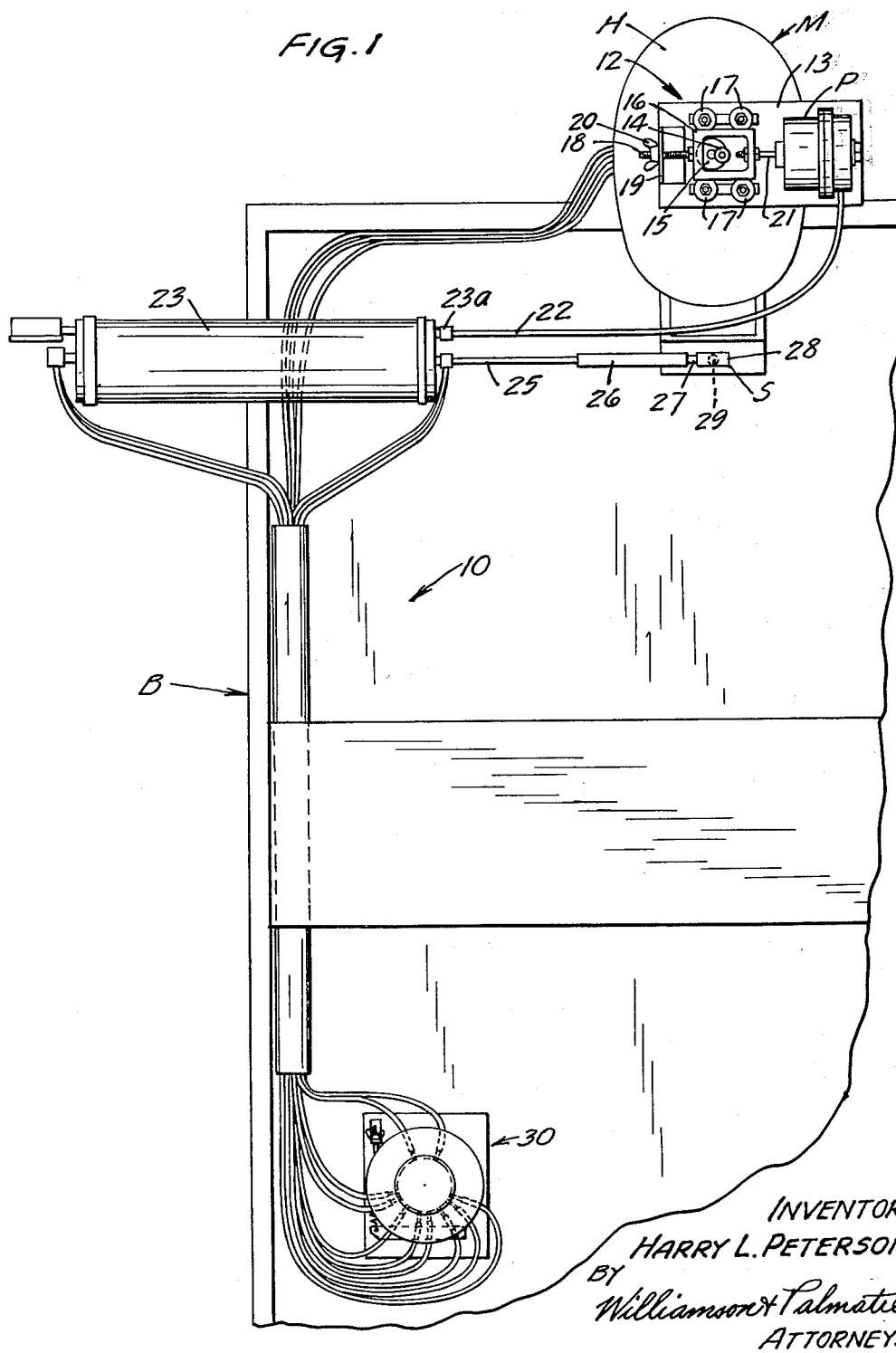

3,180,096
FLUID PRESSURE ACTUATING SYSTEM FOR USE IN POWER STEERING OF OUTBOARD MOTORS AND THE LIKE
Harry L. Peterson, % Williamson & Palmatier, 480 Pillsbury Bldg., Minneapolis, Minn.
Filed Jan. 22, 1964, Ser. No. 339,524
7 Claims. (Cl. 60—62)

This invention relates to a fluid pressure control system for variable power shifting in opposite directions of an actuating member to control operation of a device such as the steering of an outboard motor.

Preferably this invention is especially adaptable for use in controlling operation of a main driven device and has been found to be especially adaptable for use in steering outboard motors and the like. In the instant invention, the motive power involved in the system comprises fluid pressure produced by a fluid pump or compressor and operated by the primary source of power such as an outboard motor, and in which the fluid pressure serves to produce actuation of a fluid pressure motor in response to a unique valve control mechanism. It has been found that in fluid pressure systems, especially pneumatic systems, it is desirable to equalize the pressure on opposite sides of the fluid pressure actuator, such as the conventional cylinder and piston unit, so that in the event minor leaks develop in this system, such leaks will not generally interfere with the efficient operation of the system.

It is therefore a general object of my invention to provide a fluid pressure control system for variably, power controlling a fluid pressure actuator, preferably a cylinder and piston unit, through manipulation of control means and wherein the actuator controls operation of a driven device such as steering of a conventional outboard motor, and wherein the fluid pressure in the system is equalized when the control means is in the neutral condition to thereby permit efficient operation of the system even when leaks develop in the system.

Another object of this invention is the provision of a fluid pressure control system which is especially adaptable for use in steering a conventional outboard motor, the system including control means, preferably in the form of a valve mechanism, responsive to variable, light torque pressure applied usually to a substantially flat plate by the foot so that the valve mechanism may be oppositely revolved from a normal neutral position, the flat control plate very comfortably accommodating the foot of the user at all times.

Another object of this invention is the provision of a highly efficient quickly responsive system for accurately steering an outboard motor behind a boat, which includes a source of fluid under pressure such as a compressor connected in communicating relation with a sensitive manipulable control mechanism for selectively power operating an actuator through fluid pressure connected with the outboard motor to turn the same, and with an automatically operable brake mechanism for preventing movement of the outboard motor when the control mechanism is not subjected to pressure.

These and other objects and advantages of my invention will more fully appear from the following description made in connection with the accompanying drawings, wherein like character references refer to the same or similar parts throughout the several views, and in which:

FIG. 1 is a top plan view showing an embodiment of the fluid-actuated control system applied for power steering, to a conventional type outboard motor mounted upon the transom or the stern plate of a small boat;

FIG. 2 is a rear perspective view of a small boat also incorporating the fluid-actuated control system applied for power steering to the outboard motor thereof;

FIG. 3 is a diagrammatic illustration, illustrating generally the flow diagram of the fluid pressure system;

FIG. 4 is a detailed top view of the fluid responsive brake mechanism on an enlarged scale, partly in section and partly in elevation;

FIG. 5 is a top plan view of the selectively operable fluid control valve and a foot operated control element for variably operating said valve responsive to light shifting touch;

FIG. 6 is a side elevational view of the fluid control valve and foot swingable control element with parts thereof broken away to illustrate concealed parts;

FIG. 7 is a top plan view of the valve body;

FIG. 8 is a top plan view illustrating the top face of the oscillatory valving disc or rotor; and FIG. 9 is a bottom plan view illustrating the lower face of the oscillatory valving disc or rotor.

Referring now in detail to the drawings and more specifically to FIG. 1 it will be seen that one embodiment of the fluid pressure system, designated generally by the reference numeral, 10 is thereshown. It will be seen that this fluid pressure system 10 is applied for power steering to a conventional outboard motor M which, as seen in FIGS. 1 to 3 inclusive, is mounted on the stern plate of a small boat designated generally by the reference character B. Referring now to FIG. 3, it will be seen that the motor M is attached in conventional form by the mounting structure 11 which, as seen, includes clamps C which clamp to the transom or stern plate T of the boat. The motor M is also provided with the usual forwardly extending steering tongue S which in most outboards has a swingable rubber grip handle attached thereto. This handle is removed if desired in the attachment of my system. It is pointed out that the motor M is swingably supported by the mounting structure 11 for swinging movement about a substantially vertical axis.

My fluid pressure control system 10 also includes a fluid pump 12 of the diaphragm type and identical in construction to that disclosed in my co-pending application, Serial No. 124,095, filed July 14, 1961, now Patent No. 3,135,095, issued June 2, 1964. This fluid pump is described in detail in my co-pending application and includes a horizontal support plate 13 which is secured by suitable securing means such as bolts or the like and by a base plate to the upper housing H of the outboard motor M. An eccentrically positioned cam disc 14 is rotatably affixed to the upper end of the main crank shaft of the outboard motor through the intermediary of an enlarged concentric disc 15. A rectangular yoke 16 is slidably mounted for reciprocation between two sets of opposed rollers 17, each set comprising a pair of such rollers, having smooth peripheral edges which fit with working clearance and longitudinal grooves provided in the side edges of the rectangular yoke 16. These rollers 17 have ball bearing mountings which are affixed to the upstanding anchoring bolts provided at their upper threaded ends with securing nuts. The reciprocating yoke 16 is thus positioned and guided for rapid and horizontal reciprocation as shown and with substantial elimination of friction and such mounting means requiring no lubrication.

The yoke 16 is centrally apertured to provide a cam track which, as viewed in FIG. 1, has a straight rear and medial edge tangentially joining arcuate corner portions. The upstanding cam disc 18 peripherally engages the straight rear edge of the cam track in its eccentric or planetary movement, thereby efficiently retracting the yoke 16 rearwardly from the position shown in FIG. 1.

Forward movement of the rectangular yoke 16 (to the right as shown in FIG. 1) is adjustably limited by a longitudinally extended threaded bolt 18 fixed to the rear end of yoke 16 and which works through an aperture in an upstanding angle bracket 19. The wing nut 20 engages the projecting end of the bolt and may be tightened to withdraw the yoke to the left as seen in FIG. 1, a sufficient distance to disconnect the yoke from driving engagement with the cam 14. This is sometimes desirable to disconnect the device when the outboard motor is running at very high speed.

The yoke 16 is actuated forwardly by its connection with the reciprocating part of the pump. The forward end of the yoke 16 carries an adjustable actuating shaft 21 which, as shown, projects horizontally and is axially affixed to the reinforcing boss of the diaphragm of a conventional type used in diaphragm air pumps. The air pump indicated as an entirety by the letter P is of split housing construction and is mounted upon the support plate 13 and the discharge fitting thereof is connected by a flexible conduit 22 with the intake fitting of an accumulator tank 23, as shown, of elongated cylindrical construction and having closed, substantially circular ends. As pointed out above the details of construction of the fluid pump as well as the accumulator tank 29 are set forth in detail in my co-pending application, Serial No. 124,095.

An actuator cylinder 24 is rigidly secured by a suitable strapping clamp to the accumulator tank 23 being disposed below said tank and approximately of equal length therewith but substantially of smaller diameter. Again reference is made to my co-pending application, Serial No. 124,095, wherein the specific details of construction of the actuator unit including the accumulator tank 23 and the actuator cylinder are disclosed and described. The actuator cylinder is provided with an actuator piston which is reciprocable therein having smooth sealed engagement therewith and this piston carries an elongated actuator rod 25 which projects through suitable packing glands mounted on the inner or right end of the actuating cylinder as viewed in FIG. 1. The actuator rod 25 has an adjustable connection with an extension link 26 which is of tubular construction and which in turn has a rod extremity 27 at its inner end clamped to a bracket 28 which at its lower end houses the ball of a ball and socket connection 29, the ball member terminating at its lower end in an attachment bolt which is clamped by a nut to the forward portion of the steering tongue S of the outboard motor in a well known manner.

The entire actuating unit including the accumulator tank 23 and the actuating cylinder 24 is mounted for limited oscillation on a substantially vertical axis by a small turntable (not shown) and the unit is also mounted for swiveling movement on a transverse horizontal axis so that a substantially universal connection is provided. Again it is pointed out that these details of the actuating unit which include the manner in which they are preferably mounted are disclosed in my co-pending application, Serial No. 124,095 and this disclosure is incorporated by reference thereto.

It will be seen from the foregoing that the fluid pump and actuating unit are identical with that disclosed in my co-pending application, Serial No. 124,095, but the fluid pressure control system disclosed herein provides a novel control valve mechanism and a fluid pressure responsive brake mechanism which permits highly efficient, accurate, sensitive performance of the power steering function of the outboard motor.

This novel control valve mechanism designated generally by the reference numeral 30 is interposed in controlling relation with respect to the actuator cylinder 24 and is also interposed in controlling relation with resepect to a fluid responsive brake mechanism to be described hereinbelow. Fluid pressure in the present system or decompression may be applied to either side of the actuator piston located within the actuator cylinder 24 through control of the control valve mechanism 30. When pressure is applied to one side of the actuator piston within the actuator cylinder 24, the interior of the cylinder at the opposite side thereof is progressively decompressed through the valve mechanism 30.

In the embodiment of the invention illustrated, each end of the actuator cylinder 24 is provided with two air fittings or nipples. Referring now to FIGS. 1 and 3 it will be seen that the left hand end 24a of actuator cylinder 24 is provided with an air inlet nipple 24b and a decompression or discharge nipple 24c. The right hand end 24d of actuator cylinder 24 is provided with an air inlet nipple 24e and an air discharge or decompression nipple 24f. These nipples are all connected by flexible conduits to the appropriate passages for interconnection and communication of the control valve mechanism 30. It is pointed out that the diagrammatic illustration of the actuating unit actually illustrates the actuator unit in the reverse condition as contrasted with FIG. 1. Thus the end 24a of the actuator cylinder 24 appears to be at the right hand end of the actuator cylinder 24 as diagrammatically illustrated in FIG. 3. However, as pointed out above, this is reversed and this actually constitutes the left hand side of the cylinder as it is normally oriented with respect to the motor M as illustrated in FIG. 1.

The control valve mechanism 30 illustrated in detail in FIGS. 5 through 9 includes a shiftable control element which is readily responsive to light human touch as by foot operation. This control valve mechanism as illustrated in FIG. 1 may, for example, be positioned adjacent the waist or forward portion of the boat when the system is utilized for power steering. With this arrangement, the operator may very effectively control steering of the boat through foot operation at a remote point from the motor and also allows the operator to have both hands free for fishing and the like.

Referring again to FIG. 3 and FIGS. 5 through 9, it will be seen that the valve mechanism 30 includes a stationary head 31 having a plurality of passages therein for fluid communication with the actuator cylinder, the accumulator tank and the fluid responsive brake mechanism. The stationary head 31 is secured to a base plate 32 by suitable bolts or the like, a fluid seal being formed between the contacting faces of the base plate 32 and the stationary head valve 31. The base plate 32 has a plurality of foot elements 33 secured thereto by suitable bolt assemblies 34, the foot elements being preferably formed of an anti-skid material such as rubber or the like and supporting the base plate in slightly spaced relation above a surface upon which the valve mechanism is positioned.

The stationary valve head 31, as best seen in FIGS. 6 and 7, has a planar circular face 31x against which is seated an oscillatory valving disc or rotor 35, as best seen in FIGS. 6, 8 and 9. A series of ports, hereafter to be described, communicate through the circular face 31x and are circumferentially spaced thereon, each communicating with an extension of the overall passage which in turn passes through the body portion of the head 31, terminating in a fitting or nipple for connection with its appropriate conduit. Reference is made to FIGS. 1, 3 and 7 which disclose the passages in the stationary head 31 and their relationship with the associated nipples and conduits.

Thus it will be seen in FIGS. 1, 3 and 7 that a conduit C-1 connects a discharge passage 23c at the left end of the accumulator tank 23 with an air supply inlet 31a of the valve head 31. A second flexible conduit C-2 connects the air intake passage 24b at the left end of the actuator cylinder 24 with the air discharge passage 31b disposed, as shown in FIGS. 1, 3, and 7, in close relation to the air inlet port 31a. A third flexible conduit C-3 connects the outlet or decompression port 24c at the left end of the actuator cylinder with the air outlet or decompression passage 31c of the valve head 31. A fourth flexible conduit C-4 connects the air discharge port 23d at the right end of the accumulator tank 23 with air supply passage 31d in the valve head 31. Another flexible conduit C-5 connects the air supply passage 24e at the right end of actuator cylinder 24 with the air discharge passage 31e disposed closely adjacent the air inlet passage 31d on the valve head 31. A sixth conduit C–6 connects the air outlet or decompression passage 24f at the right end of the actuator cylinder with a decompression passage 31f of the valve head 31. It will therefore be seen that the arrangement of the actuator unit with respect to the valve head 31 is quite similar to the flow arrangement illustrated in my co-pending application, Serial No. 124,095.

The circular face 31x of the stationary valve head 31 is normally oriented upwardly if the valve control mechanism is positioned at the bottom of a boat, although it will be appreciated that the valve control mechanism need not have this specific orientation. However, for the purpose of clarity, this face 31x will be described and referred to as being oriented upwardly. Similarly the oscillatory valving disc or rotor 35 has opposed faces 36 and 37 as illustrated in FIGS. 8 and 9, face 36 for the purpose of clarity, being designated the lower face while face 37 will hereafter be referred to as the upper face. The faces 36 and 37 are substantially planar, the lower face 36 contacting the face 31x of the stationary valve head 31.

The stationary valve head 31 has a centrally located axially extending socket 38 therein while the oscillatory valving disc or rotor 35 has a small stub shaft 39 projecting axially from the lower face 36 thereof and which seats within the socket 38. It will therefore be seen that the oscillatory valving disc 35 is coaxially mounted with respect to the stationary valve head 31 for revolving movement relative thereto.

Referring now to FIGS. 7, 8 and 9, it will be seen that the lower face 36 of the valving disc 35 has two shallow arcuate communication grooves 35a and 35b, these grooves not extending axially through the disc. The groove 35a is of a length to span and interconnect the ports or passages 31a and 31b in the stationary valve head 31 even when the disc is turned through a partial revolution in one direction from a normally neutral position. To this end, it is pointed out that the oscillatory valving disc 35 is normally urged to the neutral position and that the groove 35a is of a length to intercommunicate the ports 31a and 31b when in the neutral position. Similarly, the groove 35b is of a length to intercommunicate the ports 31d and 31e when the valving disc 35 is in the neutral position. Thus it will be seen that the fluid will be supplied to both sides of the piston and the actuator cylinder 24 when the valving disc is in the neutral position.

A short arcuate communication slot 35c is formed in the valving disc 35 and this slot serves to selectively intercommunicate either of the decompression passages 31c or 31f formed in the stationary valve head through the valving disc where thereafter such fluid escapes to the exterior. It will be noted that the decompression passage 31c communicates with the chamber 31 C–1 formed in the stationary valve head while the decompression passage 31f communicates with the chamber 31f1. Three small ports intercommunicate the chamber 31 C–1 with the face 31x of the stationary valve head while three such ports also intercommunicate the chamber 31f1 with the face 31x. With this arrangement, each decompression passage 31c may be decompressed in stages thereby permitting smoother more sensitive operation of the actuator during the steering operation.

When the valving disc 35 is in the neutral position, the communication slot 35c will be positioned between the small sets of communication ports which interconnect with the passages 31c and 31f so that no decompression can take place with respect to the actuator cylinder 24. However, when the valving disc 35 is revolved in either direction, the communication slot 35c will intercommunicate one of the small ports with the exterior and thereafter the next adjacent port and then the third such port associated with the decompression passage. It will therefore be seen that if the valving disc 35 is shifted from the neutral to decompress through decompression passage 31c, the first small port will be communicated with the communication slot 35c while further movement of the valving disc in that direction will cause progressive decompression of that side of the actuator cylinder.

To limit oscillation of the valving disc or rotor 35, the pin 40 is secured to the stationary valve head 31 and projects upwardly from the face 31x thereof and through an arcuate slot 41 which is formed through the valve disc 35. The ends of said slot cooperate with the pin 40 to limit oscillation of the valving disc in both directions.

The stationary valve head 31 has an air inlet port or passage 31g which is connected by a conduit C–7 to the accumulator 23 whereby air under pressure is supplied to the passage 31g. An air discharge passage 31a is also formed in the stationary valve head 31 and intercommunicates the valve face 31x thereof by a suitable nipple and a flexible conduit C–8 with a fluid responsive brake mechanism which will be described in detail hereinbelow. The stationary valve head 31 also has a decompression passage 31i therein which interconnects the face 31x of the valve head with the fluid responsive brake mechanism by means of a flexible conduit C–9. Another decompression passage 31j is formed in the stationary valve head and intercommunicates the face 31x thereof by means of a suitable flexible conduit C–10 and a suitable nipple connection with the fluid responsive brake mechanism.

The oscillatory valving disc 35 is provided with a shallow arcuate communication groove 42 in the lower face 36 thereof, this communication groove being of a length to intercommunicate the passages 31g and 31h when the oscillatory disc 35 is in the neutral position. This oscillatory disc or rotor 35 is also provided with a communication slot 43 therethrough for selective communication with either of the decompression passages 31i or 31j formed in the stationary valve head. It is pointed out that when the oscillatory disc or rotor 35 is in the neutral position, the communication slot 42 formed in the lower face of the rotor or disc intercommunicates the passages 31g and 31h whereby fluid, such as air under pressure, is supplied to the fluid responsive brake mechanism. The communication slot 43, however, is positioned out of communicating relation with respect to either of the decompression passages 31i and 31j when the disc is in the neutral position. It is only upon revolving movement of the disc from the neutral position that air pressure is shut off from the fluid responsive brake mechanism in one of the decompression passages 31i and 31j is intercommunicated with the exterior by the communication slot 43. Thus it will be seen that during operation of the valve mechanism, the fluid responsive brake mechanism will also be operated.

The control valve mechanism 30 also includes a thick closure cap 44 and this closure cap has an axially downwardly projecting annular flange 45 having a substantially flat planar lower surface for engaging the flat upper marginal surface of the face 31x of the stationary valve head 31. This axially downwardly projecting flange 45 of the closure cap 44 has axially extending apertures therethrough, these apertures being disposed in registering relation with respect to threaded apertures in the stationary valve head 31 and accommodating suitable bolts to permit attachment of the cap 44 to the stationary valve head 31.

It will be seen that the circular recess defined by the flange 45 and the lower flat surface 44a of the cap 44 very nicely accommodates the oscillatory disc or rotor 35 therein. It will also be seen that the cap 44 has a centrally located, generally cylindrically shaped recess or chamber 46 therein. It is pointed out that the recess defined by the annular flange 45 in the flat lower surface 44a of the cap while accommodating the disc or rotor 35 also permits turning of this disc therein. It is further pointed out that although not shown in the drawings, the cap 44 is also provided with a pair of spring urged ball members for engaging the upper face 37 of the oscillatory disc 35 to apply equal pressure against the disc and to cause the same to seat very flush and smoothly for sealed relation against the planar face 31x of the valve head. The spring urged ball members project through openings which are spaced diametrically relative to the lower face or surface 44a of the cap.

Referring now to FIG. 8 it will be seen that the oscillatory disc or rotor 35 is provided with a pin 47 which projects axially from the upper surface thereof and which is positioned in relatively close proximity to the communication slot 43. The cap 44 has a central cylindrically shaped opening extending therethrough which communicates with the chamber 46 and which has a bearing sleeve 48 positioned therein.

Similarly, the oscillatory disc 35 has a centrally located recess or socket 49 extending downwardly therein from the upper face 37 thereof. An actuating shaft 50 is revolvably accommodated within the bearing sleeve 48 and the lower end of the actuating shaft 50 is reduced as at 51 and projects into the socket 49 of the rotor or disc 35. It will also be seen that the lower end portion of the shaft 50 has a substantially flat arm 52 secured thereto, the outer end of the arm having an aperture therein for accommodating the pin 47 therein. It will be noted that the arm 52 is of a size to be accommodated within the cylindrical chamber 46 defined in the lower central portion of the cap 44. Thus it will be seen that when the shaft 50 is revolved, this revolving movement will be transmitted through the arm 52 and pin 47 to thereby produce revolving movement of the disc or rotor 35.

The upper portion of the closure cap 44 is reduced as at 44b and this reduced upper end portion 44b has a recess in the upper portion thereof for accommodating a small attachment sleeve 53 which is secured to the upper end of the shaft 50 by suitable securing means such as a set screw or the like. The attachment sleeve 53 has an arm 54 secured thereto and projecting outwardly therefrom. It will be seen that the arm has an upwardly extending pin 55 secured to the outer end portion thereof and projecting upwardly therefrom. A suitable ball bearing assembly 56 is positioned in concentric relation upon the reduced upper end portion of the cap 44 and is revolvable relative thereto.

The control element for controlling revolving movement of the oscillatory disc 35 comprises a relatively large, substantially flat, circular actuator plate 57 and which is provided with a central opening 57a therein and which is also provided with a plurality of apertures therein which are disposed in registering relation with threaded apertures in the outer race of the ball bearing assembly 56 whereby the actuator plate may be secured by suitable securing means such as bolts to the outer race of the ball bearing assembly 56. Means are provided for connecting the actuator plate 57 with the pin 55 and to this end a substantially flat, circular connector plate 58 is provided and this connector plate has a small aperture 59 therein eccentrically disposed and through which projects the pin 55. This connector plate is also provided with a plurality of circumferentially spaced arcuate slots 58a therethrough which may be disposed in registering relation with respect to threaded apertures in the actuator plate 57. Suitable bolts 58b, as best seen in FIG. 5, permit attachment of the connector plate 58 to the actuator plate 57. It will therefore be seen that when an operator through foot operation applies slight torque pressure to the actuator plate 57, the oscillatory disc 35 will be revolved to variously relate certain of the communication passages therein.

Means are provided for normally urging the actuator plate 57 and the oscillatory disc 35 to the neutral position and this means includes a substantially flat cam bar 61 which is secured to the lower surface of the actuator plate 57 adjacent the marginal portion thereof, as best seen in FIG. 5, by suitable bolts 62. Spacer blocks 63 are interposed between the cam bar 61 and the lower surface of the actuator plate 57 to suitably space the cam bar below the actuator plate. The outer substantially straight edge of the cam bar 61 defines a camming edge or surface 64 which has a centrally located, generally arcuate recess 65 therein, as best seen in FIG. 5.

A substantially circular bearing block 66 is secured to the upper surface of the base plate 32 adjacent one side thereof and this bearing block pivotally mounts, by means of a pivot pin 67, one end of an elongate, generally flat camming arm 68. The camming arm 68 is therefore mounted for swinging movement about a substantially vertical axis. The camming arm 68 has a cam roller 69 journaled for rotation relative thereto about a substantially vertical axis, the cam roller 69 engaging the camming surface 64 of the cam bar 61.

Means are provided for normally urging the cam roller 69 into engaging relation with the camming edge or surface 64 and this means includes an elongate tension spring 70 which is secured to the free end of the camming arm 68, the end of the spring 70 being hooked into engaging relation with an aperture formed in the camming arm 68. The other end portion of the helical spring is secured to one end of a threaded adjustment element 71 which projects through an opening formed in an angle bracket 72, the latter being secured to the base plate 32. The adjustment element 71 is provided with a wing nut 73 which threadedly engages the same and which permits adjustment of the tension on the spring 70. It will be noted that the arm 68 and spring are disposed in substantially right angular relationship with respect to each other so that the spring is in the least tensioned condition when the actuator plate 57 is in the neutral position. It will also be noted that the camming roller 69 will be disposed in the arcuate recess 65 of the camming bar 61 when the actuator plate 57 is in the neutral position and revolving movement of the actuator plate 57 in either direction tensions the spring 70 whereby the actuator plate is normally urged to the neutral position. The amount of tension to be exerted by the spring may be varied by adjusting the wing nut relative to the adjustment element 71.

Means are also provided for positively limiting revolving movement of the actuator plate and to this end the actuator plate 57 has a depending stop element 74 secured to the lower surface thereof by suitable securing means such as bolts or the like and this stop element depends downwardly therefrom. The base plate 32 is provided with a pair of angle brackets 75 which project upwardly therefrom in spaced-apart relation and which are provided with threaded apertures for accommodating in threaded engagement a pair of adjustable threaded stop elements 76 which, as shown, are in the form of bolts. The angle brackets 75 are spaced-apart relative to each other whereby the stop elements 76 carried thereby will be disposed in obstructing relation with respect to the stop element 74. Thus the amount of revolving movement which may be produced by the actuator plate 57 may be adjusted even within the limits defined by the arcuate slot 41 in the oscillatory disc 35.

As pointed out above, it has been found desirable to equalize the pressure on both sides of the piston of the actuating cylinder 24 when the valve control mechanism is in the neutral position. With this arrangement, minor leaks can occur in the system and since both sides of the piston are interconnected by the control valve with the accumulator tank 23, the pressure will tend to be equalized whereby when the control valve mechanism 30 is actuated, the piston and piston rod of the actuator cylinder will be smooth and will not result in a jerky erratic motion. It has been found though that when the piston and the actuator cylinder 24 are subjected to equalized pressure on opposite sides thereof, the piston will tend to creep towards that side of the cylinder in which is disposed the piston rod. Therefore when the system is utilized to steer an outboard motor, brake means are provided for engaging and locking the motor against shifting movement when the control valve mechanism is in the neutral position.

Referring now to FIGS. 2, 3 and 4 it will be seen that one embodiment of the fluid responsive brake mechanism designated generally by the reference numeral 77 is there-shown. The mounting structure 11 for mounting the motor M upon the transom or stern plate of the boat while being of conventional construction includes in addition to the clamping means, a tubular housing 11a through which projects the housing of the crank shaft of the motor M. This tubular housing permits revolving movement of the motor M relative to the mounting structure 11. A pair of substantially flat bracket plates 78 are secured to the tubular housing 11a on opposite sides thereof by suitable securing means such as bolts 79, as best seen in FIG. 3. It will be noted that these bracket plates 78 project upwardly and rearwardly from their respective points of connection with the tubular housing 11a and are disposed in substantially parallel relation as best seen in FIG. 4.

A brake diaphragm actuator 80 is positioned between and secured to the upper rear end portions of the bracket plates 78 by bolts 81. This brake diaphragm actuator is comprised of a housing which includes a rear housing member 82 and a front housing member 83, as best seen in FIG. 4. These housing members have opposed recess portions and are secured together by suitable bolts 84, whereby the opposed recess portions define a chamber 85 which is sealed from the exterior.

A flexible diaphragm 86 traverses the chamber 85 and is clamped between the housing members by the bolts 84 and cooperates with the latter to seal the chamber 85 from the exterior. An elongate actuating shaft 87 projects through a suitable centrally located aperture in the front housing member 83 and this shaft has its rearmost end secured to the diaphragm 86 for movement therewith. A suitable bushing 88 is disposed around the opening formed in the housing member 83 and serves as a bearing support for the shaft 87. The housing member 83 also has a small opening therein which communicates the interior of the housing member with the exterior to relieve any air pressure therein due to the pumping action of the diaphragm. A helical spring 89 is positioned around the rear end portion of the shaft 87 and has one end bearing against the front housing member 83 and has its rear end bearing against the diaphragm 86.

The front end of the actuating shaft 87 is threaded and threadedly engages a ring engaging brake element 90, the latter being adjustable longitudinally of the actuating shaft 87. Referring now to FIG. 3, it will be seen that this ring engaging brake element 90 has a forwardly opening slot 91 therein, the slot 91 receiving the peripheral portion of a brake ring 92 which is secured to the motor shaft housing for movement therewith. The brake ring 92 is secured to the housing by suitable bolts or the like and is revolvable with the motor during turning movement thereof. When the diaphragm 86 is in the condition as illustrated in FIG. 4, the ring engaging brake element 90 will not actually engage the brake ring 92 so that no braking action is exerted by the brake mechanism. However, when the diaphragm element is deflected as a result of air pressure, the shaft 87 will be moved towards the motor M so that the ring engaging brake element does engage the brake ring 92 to prevent further turning movement of the motor.

Referring again to FIG. 4 it will be seen that the rear housing member 82 has three air passages therein which communicate with the chamber 85 and which permit passage of air under pressure into the chamber 85 located rearwardly of the diaphragm 86. It will be noted that the air passages in the rear housing member 82 are connected to the conduits C-8, C-9 and C-10 respectively. Thus it will be seen that those air passages which communicate with the conduits C-8 and C-10 constitute decompression passages and allow air to be removed from the chamber 85 while the passage connected to the conduit C-9 allows air under pressure to be directed into the chamber 85.

When the air passages 31g and 31h are intercommunicated by means of the communication groove 42, air under pressure will be supplied through the conduit C-9 to the chamber 85. When air is supplied to the chamber 85 the decompression passages 31j and 31i in the stationary valve head 31 will be closed so that air is not evacuated through the conduits C-8 and C-10. Air under pressure introduced into the chamber 85 causes forward deflection of the diaphragm 86 against the bias of the spring 89 and produces forward thrusting movement of the actuating shaft 87 whereby the ring engaging brake element 90 will engage the brake ring 92 to prevent further swinging movement of the motor M about its steering axis. It will be noted that when air is evacuated from the chamber 85, through either conduits C-8 or C-10, the spring 89 will cause the diaphragm to be returned to its position, as illustrated in FIG. 4. It will further be noted that air under pressure will be supplied to the chamber 85 only when the valve mechanism is in the neutral position and that decompression takes place when the valve is actuated to rotate the valving disc 35 in either direction from the neutral position. It will therefore be seen that when an operator removes his foot from the actuator plate 57, the motor will be prevented from turning by action of the fluid responsive brake mechanism. This has been desirable to prevent not only creeping as a result of the unequally effective surfaces of the piston within the actuator cylinder 24, but also to prevent any tendency of the motor to return to its in line trailing position when executing, for example, a slow long turn. This tendency of the motor to return from an angulated position with respect to the stern plate is caused by the water pressure acting against the motor.

Since the operator may face forwardly during the steering operation, means are provided for indicating to the operator when the motor M has again been centered or returned to its normal centered position. This means includes an indicator mechanism comprised of a housing 93 having a rearwardly facing slot 94 therein and extending substantially throughout the length of the housing. A pointer or needle 95 projects through the slot 94 and is mounted by suitable mounting means within the housing for movement relative thereto. This needle or pointer is movable substantially throughout the length of the slot 94 and is normally urged to the right end of the slot 94, as viewed in FIG. 2, by suitable spring means within the housing. The housing is provided with a reference indicia 96 which indicates neutral position with respect to the pointer 95. The housing 93 may be mounted upon any suitable part of the boat such as the bow deck by suitable attachment brackets 97 and conventional attachment bolts, screws or the like. The needle or pointer 95 has connected thereto a cable 98 trained around suitable pulleys 99 and this cable is also attached to the motor M. Thus when the motor is swung to the left as viewed in FIG. 2, the tension on the cable 98 will be relaxed allowing the pointer to be pulled to its right by the spring means within the housing 93. Movement of the motor M to the right as viewed in FIG. 2 will tension the cable 98 and move the pointer 97 to the left of the housing 93 and against the bias of the spring located within the housing 93. Thus an operator may readily discern, while facing forwardly, the approximate position of the motor M relative to the stern plate and general longitudinal axis of the boat which is being steered.

My fluid pressure control system may be employed to operate other primary systems, but in the embodiment illustrated, the system has been employed to control steering of an outboard motor. The valve mechanism 30 may be positioned in the waist or forward portion of the boat or at any reasonable location which is suitable to the operator. The motor M will be in the neutral position and will be disposed in substantially longitudinal alignment with the longitudinal axis of the boat as viewed in FIG. 2. The pointer 95 will also be in registering relation with respect to the reference indicia 96. Since the valve mechanism 30 is also in the neutral position, the passages 31g and 31h will be intercommunicated by the communication groove 42 whereby air is supplied under pressure to the brake mechanism thereby causing deflection of the diaphragm and interengagement of the spring engaging brake element 90 with the brake ring 92.

It is pointed out that when the brake mechanism is in the braking condition, the decompression passages thereof will not be communicated to the exterior since the communication slot 43 will not be in communication with either of the passages 31i or 31j. The communication groove 35a will intercommunicate the passages 31a and 31b while the communication groove 35b will intercommunicate the passages 31d and 31e when the valve mechanism is in the neutral position so that air under pressure is supplied to both sides of the piston within the actuator cylinder 24. The decompression passages to the actuator cylinder will be blocked off from the actuator cylinder so that the system constitutes a substantially closed system in the neutral position. Thus any leaks in the system will not unnecessarily affect operation of the steering action.

The operator may very comfortably rest his foot upon the relatively large actuator plate 57 during operation of the boat, the actuator plate providing a very comfortable support. If it is desirable to turn the boat, the operator merely rotates the actuator plate 57 by exerting a torque action with his foot whereby the oscillatory disc 35 is revolved. If the communication passages 31a and 31b are retained in communicating relation during swinging of the actuator plate 57, the first of the small ports interconnected in communicating relation with the passage 31f will be intercommunicated to the exterior by the communication slot 35c and it is preferred to begin decompression prior to closing off of air pressure to that side of the cylinder 24. Further movement of the actuator plate and oscillatory disc in this direction will result in movement of the groove 35b so that it does not intercommunicate passages 31d and 31e. The groove 35a, however, is still retained in communicating relation with respect to the passages 31a and 31b while all three of the small ports associated with decompression passage 31f will be communicated to the exterior by the communication slot 35c. Thus the piston rod 25 will be shifted by corresponding movement of the piston within the cylinder 24, and the motor M will be swung about its steering axis, thus permitting turning.

During this movement of the oscillatory disc 35, the communication groove 42 will be moved out of communicating relation with respect to the passages 31g and 31h in the stationary valve head 31 while the communication slot 43 will be moved into communicating relation with respect to the passage 31i thereby allowing the chamber 85 to be decompressed so that the diaphragm 86 will be returned to its position as illustrated in FIG. 4. This action causes movement of the ring engaging brake element 90 out of engaging relation with respect to the brake ring 92 thereby permitting turning of the motor M. The needle 95 will be displaced and the boat will, of course, be turned.

When the operator removes his foot from the actuator plate, the plate will be quickly returned to its neutral position, there being an audible click as the cam roller 69 seats within the groove 65. The oscillatory disc will also be returned to the neutral position whereby the fluid responsive brake mechanism will be actuated and the motor M will be held against turning movement. Thus the motor will be returned to its displaced or adjusted position by action of the actuator piston rod 25 and will be held against creeping movement which might be caused by leakage in the system by the brake mechanism and will be held against any tendency of the motor to turn as a result of water pressure exerted on the motor as it moves through the water. It will also be seen that when the oscillatory disc 35 is in the neutral position, the pressure on both sides of the piston and the actuator cylinder 24 will be substantially the same but as pointed out above, no creep can occur because of the fluid responsive brake mechanism. In the event that a leak ocurs in the system, there will be no erratic, jerky action with respect to the actuator piston of the actuator cylinder 24 since the pressure is equalized with respect to the actuator cylinder and piston when the valve mechanism is in the neutral condition.

If it is desirable to turn the boat in the opposite direction or to return the motor M to its original in line position with respect to the stern plate, the actuator plate 57 is revolved to retain the air passages 31d and 31e in communicating relation while the air passages 31a and 31b are disconnected. Similarly, the decompression passage 31c will be progressively opened so that decompression occurs on one side of the cylinder and compression increases on the other side thereof. The brake mechanism will also be decompressed and the turning can be readily accomplished.

It will therefore be seen from the foregoing description that I have provided a novel fluid pressure system for variably power controlling a shiftable actuator such as a cylinder and piston unit to control operation of a driven device such as steering of an outboard motor.

It will also be noted from the preceding paragraphs that my control valve mechanism not only permits remote steering of an outboard motor but also allows my system to be a closed system wherein pressure on opposite sides of the actuator piston is maintained substantially equal while the control valve is in the neutral position.

It will also be seen from the foregoing that my novel fluid pressure system not only includes a fluid pressure actuator but also includes a fluid responsive brake mechanism so that no creep will occur even when pressure is applied to both sides of the piston when the valve control mechanism is in the neutral position.

Thus it will be seen from the foregoing description that I have provided a novel and unique fluid pressure system which is especially adaptable for use in steering an outboard motor and which functions in a more efficient manner than any heretofore known comparable devices.

It will, of course, be understood that various changes may be made in the form, details, arrangement and proportions of the various parts without departing from the scope of my invention.

What is claimed is:

1. A fluid actuated control system for selectively power-shifting a power driven device such as an outboard motor, having in combination a source of gaseous medium such as air under pressure, a fluid-responsive actuator including a cylinder and a piston mounted therein, a piston rod extending through one end of said cylinder and having sealed relation with said cylinder, said rod constituting an actuating element having actuating connection with said driven device for shifting the same, opposite end portions of said cylinder having intake fluid passages therein for transmitting fluid pressure to opposite sides of said piston, said cylinder also having decompression passages at opposite end portions thereof, a fluid-responsive brake mechanism mounted for reciprocating movement in opposite directions into and out of engagement with said driven device to prevent shifting movement thereof, said brake mechanism having an air intake passage therein for transmitting fluid pressure thereto and having decompression passages therein, valve mechanism having a plurality of interconnectible fluid passages therein and having a shiftable valving element shiftable in opposite directions for simultaneously interconnecting certain of said fluid passages and disconnecting certain of said fluid passages relative to the intake of the fluid passages in said cylinder with the source of gaseous medium, and also having passages therein for connection and disconnection of the intake of said fluid passage to said brake mechanism with the source of gaseous medium, and a control mechanism removed from said actuator and having an element mounted for shifting movement in opposite directions from a neutral position through human touch and connected with the shiftable valving element whereby shifting of said control element in one direction through said valving mechanism will interconnect fluid pressure to power shift said actuator in one direction while shifting of said control element in the opposite direction will interconnect the fluid pressure to power shift said actuator in the opposite direction, and said control element when in the neutral position interconnecting fluid pressure to said brake mechanism to cause reciprocation of the same into engagement with said driven device to prevent shifting movement thereof.

2. The fluid actuated control system as defined in claim 1 wherein said valve element of said valve mechanism simultaneously interconnects the source of fluid under pressure to opposite sides of the piston within said actuator cylinder when the control element and valve element are in the neutral position whereby pressure on opposite sides of the piston will be substantially equal.

3. The fluid actuated control system as defined in claim 1 wherein said brake mechanism comprises a chamber defining housing having a diaphragm element therein, said diaphragm element being capable of deflection from a normal undeflected position in response to fluid pressure,
 means for normally urging the diaphragm to the normal position in the absence of fluid pressure,
 a brake element connected with said diaphragm for movement therewith between braking and release positions,
 means on the driven device engaged by said brake element when the latter is in the braking position.

4. The fluid actuated control system as defined in claim 1 wherein the decompression passage in the brake mechanism discharges to the exterior when the control element and valving element are shifted out of neutral position.

5. A fluid actuated control system for selectively power-shifting a power driven device such as an outboard motor, having in combination
 a small fluid pump driven from said power driven device,
 a power actuator including a cylinder and piston mounted therein, an elongate piston rod having one end secured to said piston and extending through one end of said cylinder and having connection means at the other end thereof for connection with said power driven device for shifting the latter in opposite directions,
 a compact portable valve mechanism and control unit removed from said actuator cylinder and including a common base and a revolvable actuator plate mounted for revolving movement in opposite directions and having connected therewith a journaled shaft structure common to said control and said valve mechanism, said valve mechanism comprising a stationary head having passage means in communication with said fluid pump and having fluid discharge passages, one for communication with one end of said actuator cylinder and another for communication with the opposite end of said actuator cylinder, and also having a pair of decompression passages, one for communication with one end portion of said cylinder and another for communication with the opposite end portion of said cylinder, said valve mechanism also including an oscillatory disc affixed to said common shaft for revolving movement with said actuator plate, said actuator plate and oscillatory disc being revolvable selectively in opposite directions from a normal neutral position, said oscillatory disc having communication passages for simultaneously interconnecting and communicating said source of fluid with one of said fluid discharge passages while shutting off communication between the other fluid discharge passage, and also simultaneously connecting and communicating said decompression passage with the opposite end of said actuator cylinder while closing off communication with said decompression passage to the first mentioned end of said cylinder when said actuator plate and oscillatory disc are revolved in a given direction, said oscillatory disc when in said neutral position having the communication passages thereof simultaneously interconnecting and communicating said source of fluid with both of said fluid discharge passages in said stationary head while simultaneously closing off communication of both of said decompression passages therein whereby air under pressure is supplied to opposite sides of the piston in said cylinder, said plate, shaft and valve disc being readily revolvable in unison by human touch such as foot pressure.

6. The system as defined in claim 5 wherein said actuator plate has a substantially flat upper surface to comfortably accommodate the foot of a user,
 and means for normally urging said actuator plate and oscillatory disc to the neutral position, said means including interengaging cam elements, one of which is mounted on said revolvable actuating plate.

7. The fluid actuating control system as defined in claim 5 and a fluid responsive brake mechanism mounted for reciprocating movement in opposite directions into and out of engagement with said driven device to prevent shifting movement thereof, the brake mechanism having an air intake passage therein for receiving fluid pressure therethrough and having decompression passages therein,
 said stationary head having passage means therein in communication with said source of fluid under pressure and having a fluid discharge passage for connection with said brake mechanism, and also having a pair of decompression passages therein for communication with said brake mechanism,
 said oscillatory disc having communication passages therein for simultaneously interconnecting and communicating said source of fluid with the fluid discharge passage to the brake mechanism, while shutting off communication with said decompression passages to the brake mechanism when said disc is in the neutral position interconnecting and communicating the decompression passage in the brake mechanism with a decompression passage in the valve head while simultaneously closing all communication of said source of fluid under pressure with the fluid discharge passage to the brake mechanism.

No references cited.

JULIUS E. WEST, *Primary Examiner.*
EDGAR W. GEOGHEGAN, *Examiner.*